(12) United States Patent
Rojas et al.

(10) Patent No.: US 8,298,510 B2
(45) Date of Patent: Oct. 30, 2012

(54) PROCESS FOR IMPROVING PHASE SEPARATIONS IN SOLVENT EXTRACTION CIRCUITS

(75) Inventors: Eladio Rojas, Santiago (CL); Hans C. Hein, Santiago (CL)

(73) Assignee: BASF Corporation, Florham Park, NJ (US)

( * ) Notice: Subject to any disclaimer, the term of this patent is extended or adjusted under 35 U.S.C. 154(b) by 994 days.

(21) Appl. No.: 11/803,898

(22) Filed: May 16, 2007

(65) Prior Publication Data

US 2007/0292325 A1 Dec. 20, 2007

Related U.S. Application Data

(60) Provisional application No. 60/804,866, filed on Jun. 15, 2006.

(51) Int. Cl.
*C08K 3/00* (2006.01)

(52) U.S. Cl. .............. 423/658.5; 423/1; 423/8; 423/9; 423/10; 423/24; 423/54; 423/139; 75/743; 75/744

(58) Field of Classification Search .......... 423/24, 423/1, 8–10, 139, 54, 658.5; 75/743, 744; 205/580–586; 252/184
See application file for complete search history.

(56) References Cited

U.S. PATENT DOCUMENTS

| 4,048,282 | A | * | 9/1977 | Hopkin ..................... 423/24 |
| 4,142,952 | A | * | 3/1979 | Dalton ..................... 205/581 |
| 4,190,633 | A | * | 2/1980 | Smith et al. .............. 423/321.2 |
| 4,894,407 | A | * | 1/1990 | Miller et al. .............. 524/413 |
| 5,281,336 | A | * | 1/1994 | Dalton et al. ............. 210/634 |
| 6,177,055 | B1 | | 1/2001 | Virnig et al. |
| 6,261,341 | B1 | | 7/2001 | Cifuentes et al. |
| 6,500,232 | B2 | | 12/2002 | Dorlac et al. |

FOREIGN PATENT DOCUMENTS

| WO | WO 98/56482 A1 | 12/1998 |
| WO | WO 00/60018 A1 | 10/2000 |

* cited by examiner

*Primary Examiner* — Steven Bos
(74) *Attorney, Agent, or Firm* — Bernard Lau

(57) ABSTRACT

The addition of a compatible metal salt crystal to the organic solution entering the mixer(s) in the solvent extraction stage (s) and/or the stripping stage(s), or to the emulsion mixture of the organic solution and the aqueous solution in the mixer(s), or to the mixture of the organic solution and the aqueous solution in a settler tank(s) following the mixer(s) in the solvent extraction and/or stripping stage(s) following the leaching of metal values from the ore containing that/those value(s) into an aqueous solution, and prior to the further refining of those values in processes, such as electrowinning, during mining operations for those metal values in order to improve the phase separation of the organic phase and the aqueous phase, and to promote the removal of contaminants from the organic phase.

15 Claims, No Drawings

PROCESS FOR IMPROVING PHASE SEPARATIONS IN SOLVENT EXTRACTION CIRCUITS

CROSS-REFERENCE TO RELATED APPLICATIONS

This application claims priority under 35 U.S.C. §119(e) from provisional U.S. Patent Application No. 60/804,866, filed on Jun. 15, 2006, the entire contents of which are incorporated herein by reference.

BACKGROUND OF THE INVENTION

1. Field of the Invention

This invention is directed to the phase separation of an organic phase from an aqueous phase in the solvent extraction and/or stripping stages following the leaching of metal values from the ore containing that/those value(s) into an aqueous solution, and prior to the further refining of those values in processes, such as electrowinning, during mining operations for those metal values.

2. Background and Related Art

Most metals in elemental form are obtained from the ores in which they are found by first leaching the mined ores containing those metals as various compounds ("metal values") in order to dissolve the respective metal values into an aqueous solution. The aqueous solution, now containing the metal values in dilute form, together with various impurities, such as iron and/or other minerals (known as the "pregnant leach solution" or "PLS") may then, for example, be contacted, in the widely-practiced method of solvent extraction, by an organic solution containing an extractant reagent, which can complex with the desired metal values and pull them from the leach solution into a non-aqueous, organic phase. By using an acid of appropriate strength, the metal values may be subsequently stripped back out of the organic phase into another aqueous phase, which may be used as an electrolyte for an electrodeposition, or "electrowinning", stage, wherein the elemental form of the metal may be captured.

In copper leaching operations, for example, sulfuric acid in an aqueous solution is contacted with a copper-containing ore, the acid is consumed and a/the copper content is introduced/increased in the aqueous solution. Copper in a dilute aqueous sulfuric acid solution is then commonly extracted in a solvent-extraction process by an bxime-based extractant in an organic solvent according to the chemical reaction:

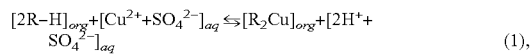

(1), where R–H is the oxime extractant. The resultant aqueous solution (also known as a "raffinate"), now depleted in copper and enriched in sulfuric acid, is returned to the leaching stage for further leaching of copper compounds from the mined ores.

By now contacting the copper-rich organic phase, in a "stripping" stage, with an aqueous solution (also referred to as a "lean electrolyte" or "LE") having a high enough sulfuric acid concentration, the above chemical reaction, (1), may be reversed. The copper, which had been loaded onto the oxime reagent in the organic medium during the solvent-extraction stage, may be re-extracted into another aqueous medium (also referred to as a "rich electrolyte" or "RE"), which then has a relatively high concentration of copper and a lower level of sulfuric acid.

The rich electrolyte solution is then subjected to an electrowinning process in a "tankhouse", where the rich electrolyte solution is passed through an electrolytic cell between an anode and a cathode. The electrical potential between the two electrodes causes copper to be deposited on the surface of the cathode as copper metal, and sulfuric acid is generated. The now copper-depleted aqueous solution (now the lean electrolyte) is typically recycled back to the stripping stage to again strip copper off the organic medium, and generally high-quality copper metal is removed from the cathode, with high electrical current efficiency.

A key factor in successfully operating a solvent extraction process is the ability to rapidly separate the aqueous and organic phases from one another in both the extraction and the stripping stages. In each stage, the organic and aqueous phases flow into a mixer where they are thoroughly and continuously mixed to form an emulsion—operating either in an "aqueous continuous" fashion, where the organic phase is distributed as fine droplets in the aqueous phase, or in an "organic continuous" fashion, where the water is distributed as fine droplets into the organic phase. The retention time in both mixing stages is typically one-to-three minutes, allowing sufficient time for the copper to be transferred between the respective phases. Following the mixing in both cases, the resulting emulsion then flows into a separating chamber, the settler tank—typically in a rectangular shape, where the residence time is typically five-to-eight minutes.

As the emulsion enters into the settler tank, the flow is broken up and distributed evenly across the tank width by means of one of a variety of "picket fence" styles, each style of which fits across the width of the tank, and has carefully-designed slots periodically along its length through which the emulsion can flow into the main tank area. Typically, the picket fence is designed in order that there are five-to-eight centimeters more of liquid level on the incoming side of the fence than on the outgoing side. Separation of the phases begins to occur almost immediately upon entering the settler, and as the phases proceed down the settler, the process of separation continues toward completion.

As phase separation takes place, one can see the formation of a clear organic phase, a dispersion or emulsion band, and a clear aqueous phase. As one travels down the length of the settler tanks, the width and depth of the dispersion or emulsion band shrinks and the size of the clear phases increases. Depending on the number, nature and amount of contaminants present in the organic and aqueous phases, as well as on the temperature and other factors, phase separation may not reach completion in either of the settler tanks. In these cases, the dispersion band remains quite thick throughout the settler tank(s), and, as the clear phases exit the tank(s), these phases may also carry along some of the emulsion from the dispersion band. If this occurs in the first extraction, or "E1", stage, where the partially-loaded organic phase contacts the incoming PLS, a portion of the aqueous phase may be carried into the stripping stage, or if it occurs in the stripping stage, this results in the transfer of the impurities in the PLS into the electrolyte. It can also result in loss of organic diluent and extractant reagent in the exiting raffinate from a stage and in an increase in operating costs, for obvious reasons.

In a number of commercial operations, one solution to this problem of poor phase separation has been to add several kilograms of a clay, such as Filtrol F1 (available from Engelhard), to the mixer of either/both the solvent extraction and/or the stripping stage(s). Unfortunately, while effective in causing the collapse of the dispersion band and in improving phase separation, the addition of clay results in the formation of crud, a troublesome, solid, stabilized emulsion. Typically, crud is formed, to some extent, in all circuits, but formation of additional crud in either, much less both, the solvent extraction and the stripping stages is undesirable.

Crud takes up space in the settler tank, making the settler less efficient in terms of phase separation. Crud must be periodically removed at a cost in manpower, and its removal also results in loss of expensive extractant and organic diluent. In addition, some solids may be transferred into the electrolyte, causing irregular copper deposits on the cathodes, thus increasing the number of cathodes rejected for quality considerations and/or reducing the value for which the cathodes may be sold.

We have now surprisingly found that the use of clay may be effectively replaced by the addition of crystals of a metal salt (e.g., copper sulfate in a copper extraction process, nickel sulfate or nickel ammonium sulfate in a nickel solvent extraction system, and so forth) to the mixture of the aqueous and organic phases in either or both of the mixers in the solvent extraction and/or stripping stages. The addition of the metal salt crystals results in an effective collapse of the dispersion band, and may also promote collection of contaminants from the organic phase at its interface with the emulsion band, making those contaminants easier to remove. The metal salt crystals dissolve in the aqueous phase and do not contribute to crud formation, as the clay does, and the added metal (i.e., copper, nickel, etc.) ions are not lost, but may be recovered in the solvent extraction process.

The copper sulfate crystals may be readily obtained by taking a small portion of the incoming PLS and processing it through a small solvent extraction plant designed to recover copper sulfate crystals from the strip solution. This is a technology that is practiced commercially in a number of small plants.

BRIEF SUMMARY OF THE INVENTION

This invention is directed to the addition of a compatible metal salt crystal to the mixer(s) and/or settling tank(s) in the solvent extraction and/or stripping stage(s) in the solvent extraction/stripping process of a mining operation in order to improve the phase separation of the organic phase and the aqueous phase, and to promote the removal of contaminants from the organic phase.

Preferably, the metal salt is one in which the anion is the same as that present in the aqueous feed solution. Also preferably, the metal salt crystal is a soluble salt of the metal being extracted in the process, but in some cases, the metal may be the salt of typical metal impurity, such as, for example, of iron in the case of copper recovery. In such a case, iron sulfate would be an acceptable metal salt at a reasonable concentration. The metal salt crystals are preferably added to the organic phase entering the mixer of either the solvent extraction or the stripping stage, but they may also be added directly to the mixture in the mixer or to the resulting emulsion of the two phases in the settler tank, and may be added either batchwise or continuously, using standard equipment designed to feed solids.

DETAILED DESCRIPTION OF THE INVENTION

This invention provides a method of improving phase separation between the organic phase and the aqueous phase in the settler tanks following the solvent extraction stage and/or the stripping stage in a process involving extraction of metal values from aqueous leach solutions, containing the metal value. In these processes, organic solutions, containing at least one metal extraction reagent, complexes with and transfers at least a portion of the metal value from the aqueous solution into the organic extractant solution. The process comprises adding a "compatible metal salt" to the organic solution entering a mixer in the solvent extraction stage and/or subsequent stripping stage, or to the resulting emulsion mixture in the mixer of either/both stage(s), or to the mixture of the two phases in a settler tank, following the mixer for either/both stage(s).

By a "compatible metal salt" is meant a salt that does not materially interfere with the extraction, electrowinning or other part(s) of the overall recovery process of the particular metal being recovered. In a process for the recovery of copper, a compatible metal salt may be selected from the group consisting of copper sulfate, iron sulfate, aluminum sulfate, magnesium sulfate, sodium sulfate, and a mixture of two or more of them. Copper sulfate, iron sulfate, or a mixture thereof are preferred, with copper sulfate most preferred, as in such a process, for example, a nickel cation could cause difficulty in the electrowinning stage. For the recovery of nickel, a compatible metal salt may be selected from the group consisting of nickel sulfate, nickel ammonium sulfate, nickel hydroxide, nickel carbonate, and a mixture of two or more of them, with nickel sulfate, nickel ammonium sulfate, or a mixture thereof being preferred. For the recovery of uranium, molybdenum or gold, a compatible metal salt could be sodium sulfate.

The compatible metal salt is preferably in the form of a particulate solid (e.g., crystals) or an aqueous salt pulp, more preferably in the form of crystals. However, in some cases, the salt may be in an amorphous form. When the particulate solid salt is in the form of a powder, the particles are preferably in sizes varying from very fine to larger particles, more preferably including particles no larger than one centimeter in diameter. Even more preferably, the salt is in the form of a fine powder, with a mixture of particles having an average size of 5 mm or less, and most preferably having an average size of 2 mm or less.

A compatible metal salt pulp comprises a mixture of the crystalline salt and a saturated electrolyte of the metal ion to be recovered. For copper recovery, a salt pulp would preferably comprise copper sulfate crystals in a copper-saturated electrolyte, which could be conveniently produced on site by known processes.

The compatible metal salt is added to the organic solution entering a mixer of the solvent extraction stage and/or the stripping stage, or to the resulting emulsion mixture in the mixer, or to the mixture of the two phases in a settler tank following the solvent extraction step and/or the stripping step. The preferred practice is to add the solid crystalline salt directly to the emulsion of the aqueous phase and the organic phase in the mixer. Adding the metal salt directly to an aqueous phase will likely result in too rapid dissolution of the metal salt, which would likely significantly reduce its effectiveness in phase separation.

The compatible metal salt may be added continuously or batch-wise, and may be added as needed, for example, based on observation of the emulsion band in the settler tank, or periodically, for example, based on the amount of the organic flow or on the amount of copper being produced. The metal salt may be added several times per day (from 4 to 100 times per day) or on a continuous basis.

The compatible metal salt is preferably added in an amount of 1 kg of salt per 50 tons of metal being produced, and more preferably in an amount of 1 kg of salt per 0.1-5 tons of the metal being produced, but 1 kg of salt per 0.05 ton of copper produced may be sufficient. For example, for the production of copper, the metal salt (e.g., copper sulfate) could be added in amounts up to 0.5 g Cu/liter of organic flow (2 kg of copper sulfate per cubic meter of organic solution); preferably 0.00025 to 2 g/l of organic flow; more preferably 0.0005 to 1 g/l of organic solution flow; and most preferably 0.001 to 0.5 g/l of organic solution flow. Put in terms of concentration rates of the added copper sulfate, 2-10 ppm of aqueous soluble solids (e.g., copper sulfate) in an organic solution flow has a significant effect. Usually the copper transfer in an organic solution ranges from 1.0 to 10 g/l Cu, where, 5 ppm solids (e.g., copper sulfate) is equivalent to 1 kg of salts per 0.2 to 2 ton of copper produced.

In the case of the addition of copper sulfate in the copper recovery process, a great excess of the preferred copper sulfate salt may be used, as copper sulfate will increase copper production.

The following example is intended only to illustrate the practice of the invention and not to limit the nature or scope of the invention.

EXAMPLE

In a commercial solvent extraction plant, the organic-to-aqueous ratio in the solvent extraction mixer box was 1.14 to 1, and the mixer was operating organic continuous. The organic flow was 149 m$^3$/hr and the PLS flow was 130 m$^3$/hr. The plant is configured with two stages (E1 and E2) of extraction in series and one stage of stripping. The stripped organic phase enters the E2 extraction unit, where it is contacted with the partially-metal-extracted aqueous phase from the E1 extraction unit. The partially-loaded organic phase exits the E2 unit and is transferred to the E1 unit, where it is contacted with the incoming PLS. The organic phase exits the E1 unit as a loaded-organic phase, which then proceeds through an organic surge tank to stripping. Before addition of the copper sulfate crystals, the depth of the dispersion band in front of the picket fence in the E1 settler tank was 25 cm, and the depth in the central part of the settler tank behind the picket fence was 6 cm. 1.5 kg of copper sulfate crystals was added to the E2 organic weir, from which the organic phase flows directly to the E1 mixer. Within 5 minutes, the dispersion band was reduced from 25 cm to 2 cm ahead of the picket fence, and to zero in the central part of the settler tank. The effect lasted approximately 30 minutes, and then the phase band began to build again. Copper sulfate crystals were then again added to the E2 organic phase, resulting in another collapse of the dispersion band. By comparison, current practice with insoluble clay or equivalent material added to the mixers in commercial plants may last from 10 to 120 minutes.

What is claimed is:

1. A method for improving phase separation in a process for recovering a metal from an aqueous solution containing the metal, with an organic solution containing at least one metal-extraction reagent, wherein at least a portion of the metal has been extracted into the organic solution in a solvent extraction stage, the method comprising the step of:
    (a) adding a compatible metal salt selected from the group consisting of copper sulfate, iron sulfate, aluminum sulfate, magnesium sulfate, sodium sulfate, and mixtures thereof, to the organic solution entering one or more mixers in a solvent extraction stage and/or a stripping stage following the solvent extraction stage, or
    (b) adding a compatible metal salt selected from the group consisting of copper sulfate, iron sulfate, aluminum sulfate, magnesium sulfate, sodium sulfate, and mixtures thereof, to an emulsion mixture of the aqueous solution and the organic solution in one or more mixers in a solvent extraction stage and/or a stripping stage following the solvent extraction stage, or
    (c) adding a compatible metal salt selected from the group consisting of copper sulfate, iron sulfate, aluminum sulfate, magnesium sulfate, sodium sulfate, and mixtures thereof, to a mixture of the aqueous solution and the organic solution in a settler tank following a mixer(s),
wherein said compatible metal salt is in the form of a particulate solid or an aqueous salt pulp, and wherein the addition of said salt causes the aqueous solution and the organic solution to separate.

2. The method of claim 1, wherein said compatible metal salt is selected from the group consisting of copper sulfate, iron sulfate, and mixtures thereof.

3. The method of claim 2, wherein said compatible metal salt is copper sulfate.

4. The method of claim 1, wherein said metal is uranium, molybdenum or gold, and said compatible metal salt is sodium sulfate.

5. The method of claim 1, wherein said compatible metal salt is in the form of a powder.

6. The method of claim 1, wherein said compatible metal salt is added to the emulsion mixture in the mixer.

7. The method of claim 1, wherein said compatible metal salt is added continuously or batch-wise.

8. The method of claim 1, wherein said compatible metal salt is added in the amount of 1 kg of salt per 0.1-5 tons of metal produced.

9. A method for improving phase separation in an extraction stage or stripping stage in a solvent extraction and stripping of copper from an aqueous solution containing copper, with an organic solution containing at least one copper extraction reagent, wherein at least a portion of the copper has been transferred into the organic solution, the method comprising the step of:
    (a) adding copper sulfate to the organic solution entering a mixer in the extraction stage and/or the stripping stage, or
    (b) adding copper sulfate to an emulsion mixture of the organic solution and the aqueous solution in one or more mixers in a solvent extraction stage and/or a stripping stage following the solvent extraction stage, or
    (c) adding copper sulfate to a mixture of the organic solution and the aqueous solution in a settler tank following a mixer,
wherein said copper sulfate is in the form of a particulate solid or an aqueous salt pulp, and wherein the addition of said copper sulfate causes the aqueous solution and the organic solution to separate.

10. The method of claim 9, wherein said copper sulfate is in the form of a powder.

11. The method of claim 9, wherein said copper sulfate is added to the emulsion mixture in the mixer.

12. The method of claim 9, wherein said copper sulfate is added continuously or batch-wise.

13. The method of claim 9, wherein said cooper sulfate is added in the amount of 1 kg per 0.1-5 tons of metal produced.

14. The method of claim 1, wherein said compatible metal salt in the form of a particulate solid or an aqueous salt pulp, comprises crystals.

15. The method of claim 9, wherein said copper sulfate in the form of a particulate solid or aqueous salt pulp, comprises crystals of copper sulfate.

* * * * *